United States Patent [19]
Wu et al.

[11] Patent Number: 6,101,003
[45] Date of Patent: *Aug. 8, 2000

[54] CASSETTE SCANNING APPARATUS

[75] Inventors: Jim Wu, Hsinchu; Donald Chen, Ping Chen, both of Taiwan

[73] Assignee: Mustek Systems Inc., Hsinchu, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/887,514

[22] Filed: Jul. 3, 1997

[51] Int. Cl.$^7$ ...................................................... H04N 1/04
[52] U.S. Cl. .............................................................. 358/474
[58] Field of Search ..................................... 358/473, 474, 358/476, 480, 482, 483, 484, 486, 487, 490, 491, 492, 494, 497, 498; 355/308, 233, 234, 235; 399/160, 209, 211, 365, 377, 378, 379, 556.05, 559.06, 559.07, 559.08

[56] References Cited

U.S. PATENT DOCUMENTS

| | | |
|---|---|---|
| 4,870,502 | 9/1989 | Dreinhoff ................................ 358/474 |
| 5,663,812 | 9/1997 | Pan ......................................... 358/474 |
| 5,742,407 | 4/1998 | Albrecht et al. ........................ 358/496 |
| 5,767,990 | 6/1998 | Ikeda ...................................... 358/475 |
| 5,790,278 | 8/1998 | Ehrne et al. ............................ 358/496 |
| 5,801,852 | 9/1998 | Truc ........................................ 358/502 |
| 5,814,809 | 9/1998 | Han ..................................... 250/208.1 |
| 5,818,611 | 10/1998 | Shih ....................................... 358/474 |
| 5,936,747 | 8/1999 | Lin et al. ................................ 358/496 |

FOREIGN PATENT DOCUMENTS 2 299 727  10/1996  United Kingdom .

*Primary Examiner*—Jerome Grant, II
*Attorney, Agent, or Firm*—Christensen O'Connor Johnson Kindness PLLC

[57] ABSTRACT

The present invention proposes a contact image sensor scanning apparatus includes a base, a object holder set in the slot way, a image capturing apparatus, a transmission apparatus, and a driving apparatus to read the image of scanned object. Also, due to the space occupied by these apparatus are relevant small, it can build-in computer.

13 Claims, 3 Drawing Sheets

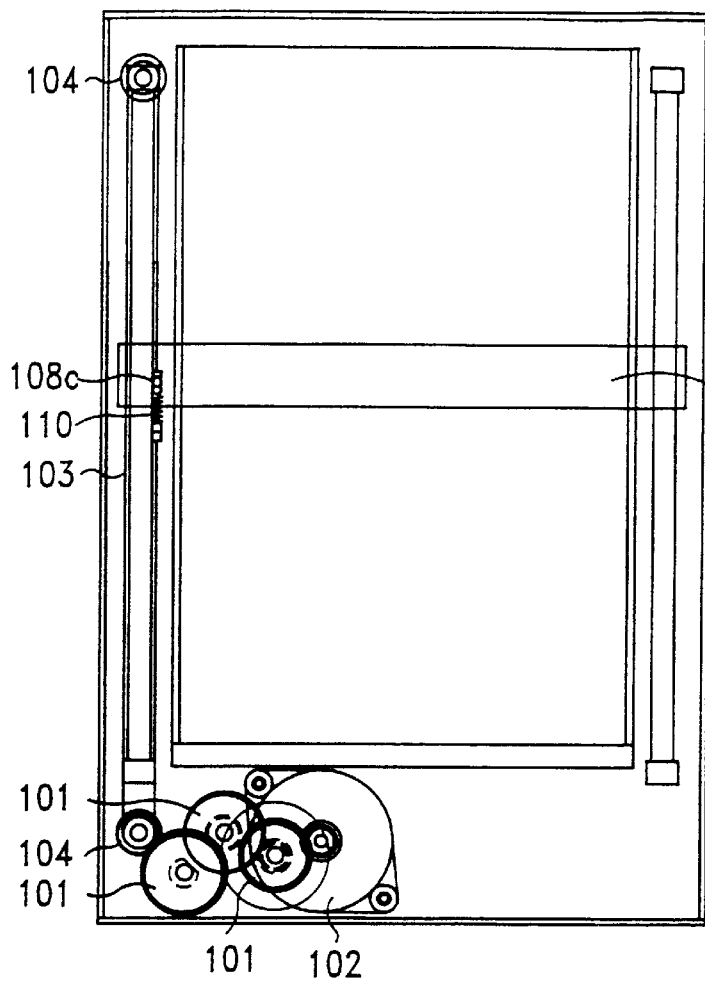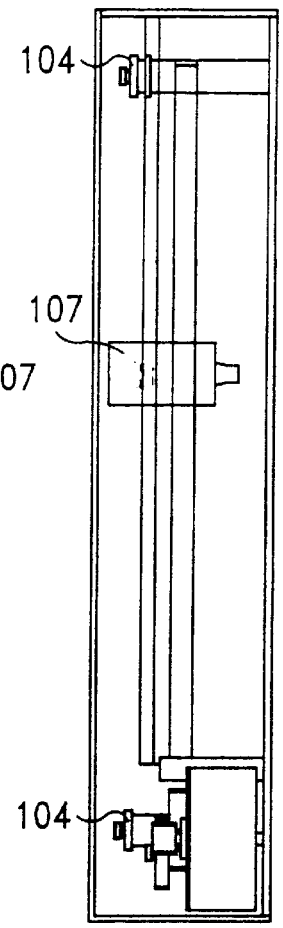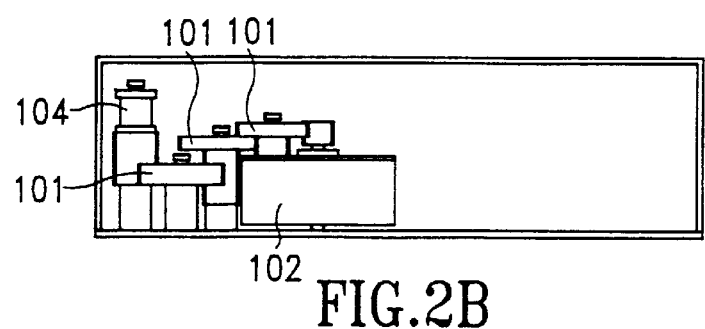
FIG.2A FIG.2C
FIG.2B

CASSETTE SCANNING APPARATUS

BACKGROUND OF THE INVENTION

1. Field of the Invention

The present invention relates to an image scanning apparatus, especially to a cassette scanning apparatus.

2. Description of the Prior Art

Following the progressive step of science and technology, various products become novel and useful, especially in the field of designing the scanner. Despite the demands of high resolution, scanner is also pursued to build in a computer.

In prior art the roller is used to feed a scanned object into the scanner, but roller is easy to adhere dust and powder. There is also a problem related to paper folded while the document being fed.

The conventional image sensor of scanner either build-in computer or flat-bed is generally used the CCD(Charge-Couple Device) as the image sensor. However, the CCD need to adjust the optical path, in addition lots of devices (includes mirror, lens, and illuminator) should be used for guiding light to the CCD, which occupy space. Another image sensor called CIS(Contact Image Sensor), it combined illuminator, lens, and sensor together, the designer do not need to adjust optical path, and save the space which is relative to the CCD.

SUMMARY OF THE INVENTION

The present invention proposes a contact image sensor scanning apparatus that includes a base, an object holder set in the slot way, an image capturing apparatus, a transmission apparatus, and a driving apparatus to read the image of scanned object. Also, due to the space occupied by these apparatus are relevant small, it can built in the computer.

BRIEF DESCRIPTION OF THE DRAWINGS

For a further understanding of the above and other features and advantages, reference is made to the following detailed description and drawings, in which:

FIG. 2A is the right side view of the scanning apparatus of the present invention;

FIG. 2B is the top view of the scanning apparatus of the present invention;

FIG. 2C is the cross section view of the scanning apparatus of the present invention;

DESCRIPTION OF THE PREFERRED EMBODIMENT

The present invention will be described in detail with reference to drawings. The purpose of the present invention is to provide a cassette contact image sensor scanning apparatus. The detail processes will be described below.

Figure 1:
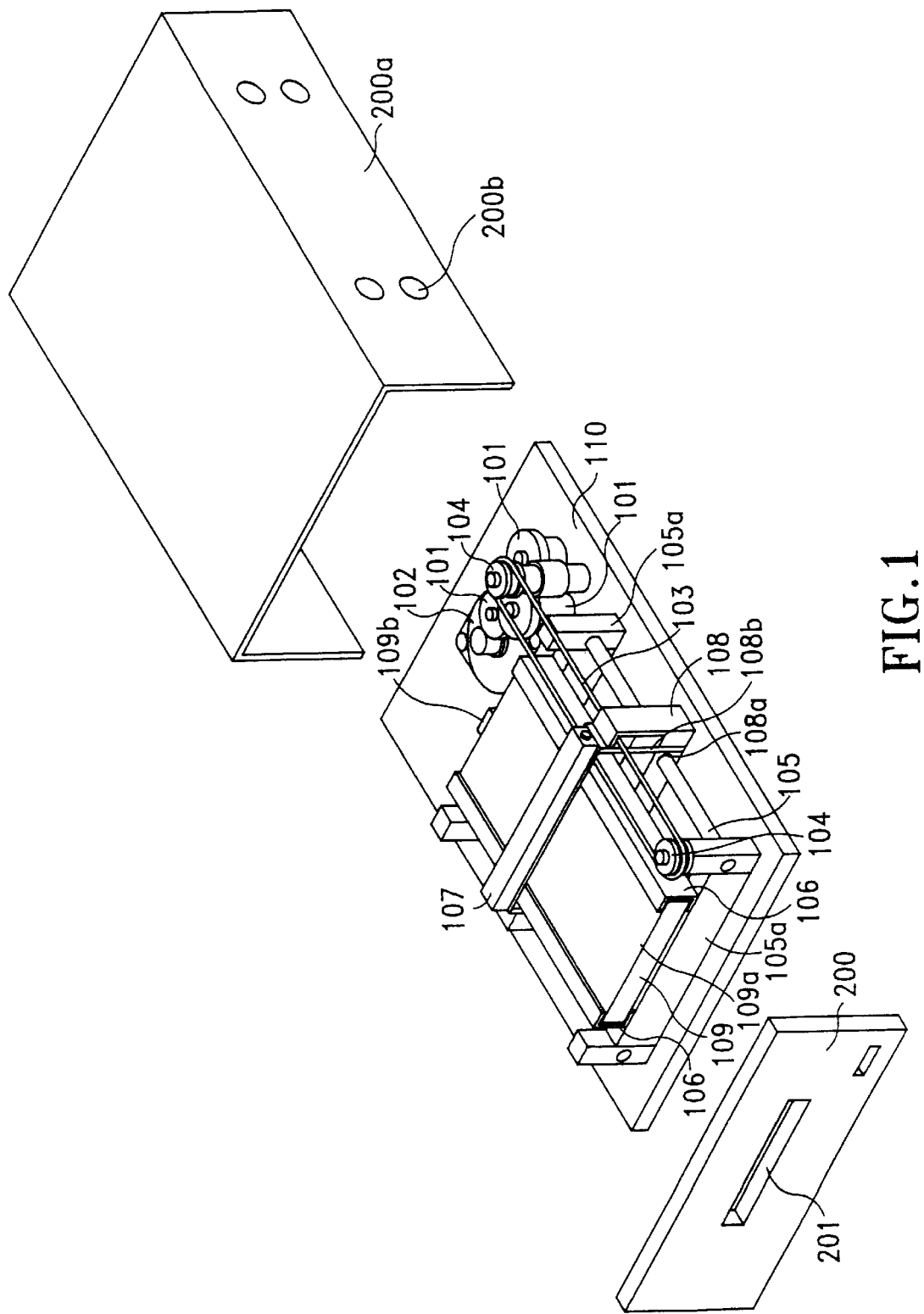
FIG. 1 illustrates the scanning apparatus of the present invention.

Turning now to the drawings, FIG. 1 shows the scanning apparatus of the present invention, which includes driving apparatus, image capturing apparatus transmission apparatus, object holder, and a base. FIG. 1 also indicate the basic components device of driving apparatus, such as, gear set 101, stepping motor 102, wire 103(or timing belt), pulley 104, and slot way 106. The components of transmission apparatus 105 include a pair of parallel shafts, the two ends of the parallel shafts having a support 105a fixed on the base 110, respectively. The components of image capturing apparatus include CIS(Contact Image Sensor) 107, and a carriage 108 having guiding hole 108a, and support arms 108b at two sides of carriage 108. The transmission apparatus 105 is encased by the guiding holes of the carriage. The object holder 109 includes a transparent cover 109a and a hook 109b. The base 110 is used to carriage the apparatus described above. After a scanned object, for example, a document is placed into the object holder 109, the object holder 109 is sent to a predetermined position guided by slot ways 106 and fixed by the hook 109b. The stepping motor 102 transmits power through gear set 101, wire 103, and pulley 104 to the carriage 108, thereby moving the carriage 108 the carriage 108 can move back and forth along the transmission apparatus 105(in this embodiment is a pair of parallel shafts) in the vertical direction by the guiding of the guiding hole 108a. Consequently, the CIS 107 fixed on the carriage 108 can perform a scanning procedure on the scanned object(i.e. document). After completing the scanning process, the object holder 109 is pushed slightly, so that the elastic force of the hook 109b will pull the object holder outside a little bit. Then the object holder 109 can be pulled out easily. The apparatus described above can be built in a computer or externally connected to a computer in the manner of a flat bed scanner. A plate 200 of the case 200a with an opening 201 can provide the function of pulling and pushing the object holder 109 from the opening 201. A plurality of small hole 200b are used to fix the scanner in the case 200a(just like the floppy drive fixed in the computer case).

FIG. 2A, FIG. 2B, and FIG. 2C illustrate the inter structure of the scanning apparatus by right side view, top view, and cross section view, respectively. In these figures, there are also illustrated gear set 101, stepping motor 102, wire 103(or timing belt), pulley 104, and CIS 107. The function of the gear set 101 is to decelerate the speed of the stepping motor 102. The reason of decelerating the speed of stepping motor 102 is that the more rapidly the CIS 107 moves forth and back, the less the resolution that the scanning apparatus can achieve. In this present invention, the quality of an image depends on the resolution of CIS 107. The resolution of the horizontal direction has been decided due to the specification of CIS 107, and the resolution of the vertical direction is determined by the moving speed of the CIS 107. If there is no gear set 101 to decelerate the stepping motor 102, the resolution will not met the demand of image output. In addition, there is a pillar support 108c in one side of the carriage 108 to connect with a spring 110. The spring 110 is used to keep tension on the wire 103 and make the wire 103 extended easily. The connective relation between the spring 110 and the carriage 108 is shown in FIG. 3.

Figure 3:
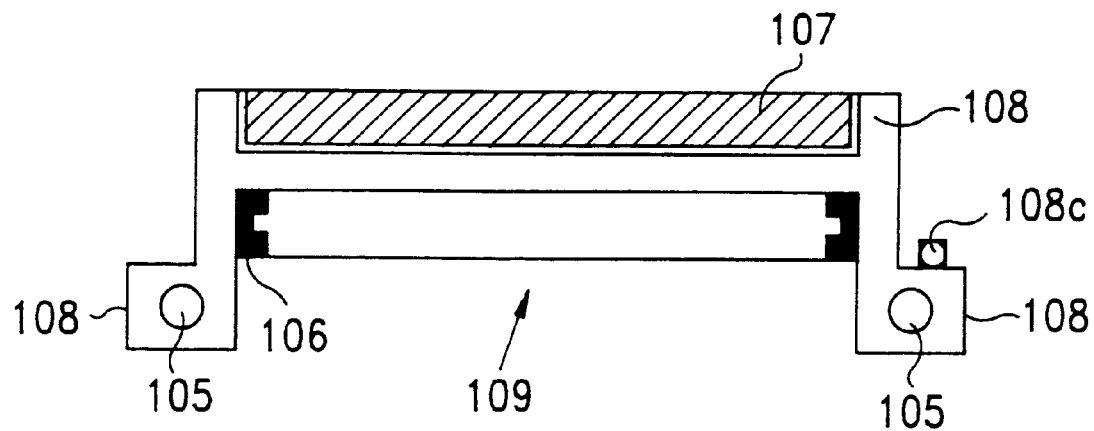
FIG. 3 is a cross section view of the connective relation between CIS(Contact Image Sensor), carriage, and object holder according to the present invention.

FIG. 3 is the cross section view of the connective relation between CIS(Contact Image Sensor) 107, carriage 108, and object holder 109 according to the present invention. FIG. 3 shows the CIS 107 fixed on the carriage 108. There is a pillar support 108c in one side of the carriage 108 to connect with the spring 110. The power of stepping motor 101 is transmitted from gear set 101, wire 103, and pulley 104 to the carriage to move the carriage 108 back and forth along the transmission apparatus 105(in this embodiment is a pair of parallel shaft) in the vertical direction by the guiding of the guiding hole 108a. Consequently the CIS 107 fixed on the carriage 108 can perform a scanning procedure on the scanned object(i.e. document).

Figure 4:
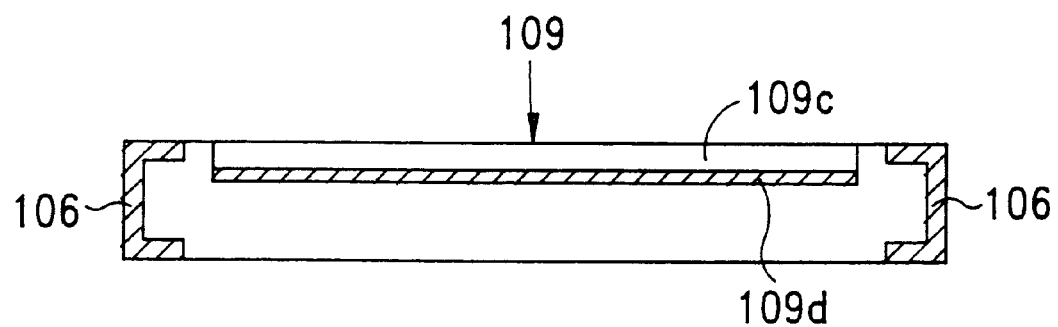
FIG. 4 is a cross section view of the connective relation between object holder and slot way according to the present invention.

Referring to FIG. 4, it shows the connective relation between object holder 109 with a transparent coverage 109c and the slot way 106. The scanned object(ie. a document) 109d is placed under the transparent cover 109c. Under such arrangement, the object holder 109 can be smoothly fed into the computer case via slot way 106, and be fixed by the hook 109b. The slot way 106 is placed and fixed between the two ends of the support 105a of transmission apparatus 105, and in the inner side of carriage 108.

As is understood by a person skilled in the art, the foregoing preferred embodiment of the present invention is illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A scanning apparatus, comprising:
    a base;
    an object holder configured to contain and hold a scanned object when said scanned object is scanned, wherein said object holder has edge portions and has a transparent cover covering said scanned object and a hook mounted on one side of said object holder;
    a pair of slot ways, set on said base, said pair of slot ways being configured so that said edge portions of said object holder can be slidably fitted into said pair of slot ways, said pair of slot ways being further configured to guide said object holder to a predetermined position when said object holder is being fitted into said pair of slot ways, wherein said object holder is fixed at said predetermined position by said hook, and when the scanning procedures are finished said object holder may be pulled outside from said predetermined position by pushing said object holder in order to let said hook release elastic forces for pushing said object holder outside;
    an image capturing apparatus configured to scan said scanned object held in said object holder through said transparent cover of said object holder;
    a transmission apparatus set on said base and configured to support and guide said image capturing apparatus, wherein said image capturing apparatus can be moved back and forth on said transmission apparatus; and
    a driving apparatus set on said base and configured to move said image capturing apparatus back and forth on said transmission apparatus in scanning said scanned object.

2. The scanning apparatus according to claim 1, wherein said object holder in which is contained said scanned object is configured to be pushed into said scanning apparatus and pulled away from said scanning apparatus by said pair of slot ways.

3. The scanning apparatus according to claim 1, wherein said image capturing apparatus comprising:
    a CIS (Contact Image Sensor) configured to scan said scanned object; and
    a carriage having two sides and having guiding holes and supporting arms in said two sides for supporting said CIS.

4. The scanning apparatus according to claim 3, wherein said transmission apparatus comprises a pair of parallel shafts, encased by said guiding holes of said carriage, wherein said carriage used to support said CIS may be moved back and forth along said pair of parallel shafts.

5. The scanning apparatus according to claim 1, wherein said driving apparatus comprises:
    a motor;
    a gear set coupled to the motor;
    a plurality of pulleys coupled to said gear set; and
    a power transmitting element coupled to said image capturing apparatus and said plurality of pulleys.

6. The scanning apparatus according to claim 5, wherein said power transmitting element comprises a wire.

7. The scanning apparatus according to claim 5, wherein said power transmitting element comprises a timing belt.

8. The scanning apparatus according to claim 5, wherein said motor is a stepping motor.

9. A scanning apparatus, comprising:
    a base;
    An object holder configured to contain and hold a scanned object when said scanned object is scanned, wherein said object holder has edge portions and has a transparent cover covering said scanned object and a hook mounted on one side of said object holder;
    a pair of slot ways, set on said base, configured so that said edge portions of said object holder can be slidably fitted into said pair of slot ways, said pair of slot ways being further configured to guide said object holder to a predetermined position when said object holder is fitted into said pair of slot ways wherein said object holder is fixed at said predetermined position by said hook, and when the scanning procedures are finished said object holder may be pulled outside from said predetermined position by pushing said object holder in order to let said hook release elastic forces for pushing said object holder outside;
    a CIS configured to scan said scanned object contained in said object holder through said transparent cover;
    a carriage coupled to said CIS, said carrier being configured to hold and support said CIS, wherein said carriage has guiding holes and supporting arms in two sides for supporting said CIS;
    a pair of parallel shafts encased by said guiding holes of said carriage being set on said base and parallel to said pair of slot ways, said pair of parallel shafts being configured to support and guide said carriage, said carriage being configured to move back and forth along said pair of parallel shafts; and
    a driving apparatus set on said base, said driving apparatus being configured to drive said carriage to move back and forth along said pair of parallel shafts in scanning said scanned object, wherein said driving apparatus further comprises:
    a motor;
    a gear set for transmitting the power of said motor and decelerating the speed of said motor, said gear set constituted of a plurality of gears, a plurality of pulleys for transmitting the power of said motor, one of said pulleys connecting to said gear set; and
    a power transmitting element coupled to said CIS and said plurality of pulleys.

10. The scanning apparatus according to claim 5, wherein said object holder is configured to be pushed into said scanning apparatus and pulled away from said scanning apparatus by said pair of slot ways.

11. The scanning apparatus according to claim 9, wherein said power transmitting element comprises a wire.

12. The scanning apparatus according to claim 9, wherein said power transmitting element comprises a timing belt.

13. The scanning apparatus according to claim 9, wherein said motor is a stepping motor.

* * * * *

UNITED STATES PATENT AND TRADEMARK OFFICE
CERTIFICATE OF CORRECTION

PATENT NO. : 6,101,003
DATED : August 8, 2000
INVENTOR(S) : J. Wu et al.

It is certified that error appears in the above-identified patent and that said Letters Patent is hereby corrected as shown below:

| COLUMN | LINE | ERROR |
|---|---|---|
| 4 (Claim 9, | 60-64 lines 38-42) | the phrase beginning "a gear set" should begin a new subparagraph |
| 4 (Claim 9, | 66-67 lines 43-44) | the phrase beginning "a power transmitting element" should begin a new subparagraph |
| 5 (Claim 10, | 1 lines 1) | "5, should read --9,--" |

Signed and Sealed this

Twenty-ninth Day of May, 2001

Attest:

NICHOLAS P. GODICI

Attesting Officer

Acting Director of the United States Patent and Trademark Office